United States Patent [19]

Lewis

[11] 3,950,996
[45] Apr. 20, 1976

[54] FLUID PRESSURE TRANSDUCER
[75] Inventor: George E. Lewis, Arcadia, Calif.
[73] Assignee: Hydril Company, Los Angeles, Calif.
[22] Filed: Feb. 4, 1974
[21] Appl. No.: 439,379

[52] U.S. Cl. ........................... 73/407 R; 73/398 AR
[51] Int. Cl.² ...................... G01L 7/08; G01L 9/04
[58] Field of Search ............. 73/406, 407 R, 398 R, 73/398 AR, 407 PR; 338/4, 42

[56] References Cited
UNITED STATES PATENTS
2,770,258  11/1956  Bowditch ............................. 73/407
3,153,935  10/1964  Karlson ................................ 73/398
3,222,628  12/1965  Pien ...................................... 338/4

Primary Examiner—Donald O. Woodiel
Attorney, Agent, or Firm—William W. Haefliger

[57] ABSTRACT

A transducer useful to measure fluid pressure over a wide range incorporates dual diaphragms for biasing a shaft whose axial motion operates a motion sensor, the movement of one diaphragm limited in one direction of shaft axial movement, and the movement of the other diaphragm limited in the opposite direction of shaft axial movement.

8 Claims, 4 Drawing Figures

FLUID PRESSURE TRANSDUCER

BACKGROUND OF THE INVENTION

This invention relates generally to pressure transducers, and more particularly concerns transducers for measuring an extremely wide range of pressures, as for example may be encountered in determining the gas content of well drilling mud.

In co-pending application of George E. Lewis et al. entitled "Mud Gas Content Sampling Device", there is a description of a drilling mud sampler which depends for its operation upon the measurement of both relatively high and low fluid pressures. For example, a mud sample is ingested into a chamber at relatively high ambient pressure encountered deep in a well; thereafter, the pressure in the chamber is reduced in order to expand the mud gas content. The values of the initial mud pressure and the final reduced pressure are sensed and used in the determination of the mud gas content. No presently available transducer apparatus of which I am aware is capable of measuring such high and low pressures with the accuracy and in the unusually advantageous manner as is now made possible by the present invention.

SUMMARY OF THE INVENTION

It is a major object of the invention to provide a simple, rugged transducer which will effectively measure fluid pressures over a wide range, with extreme accuracy, and which offers the many advantages such as will appear herein. Basically, the transducer comprises:

a. a housing, b. an axially movable shaft within the housing, c. an annular flange within the housing and forming an opening through which the shaft projects, d. a first elastomer diaphragm having a radially outer portion operatively connected with the housing and a radially inner portion attached to the shaft for axial movement therewith at one side of the flange, said first diaphragm having one side exposed to pressure application by said fluid communicated to the interior of the housing, the opposite side of the first diagram facing said flange configured to progressively limit axial displacement of the diaphragm inner portion as the shaft is displaced axially forwardly, e. a second elastomer diaphragm at the opposite side of said flange and operatively connected with the shaft to guide shaft axial movement, and to resist axially rearward movement of the shaft, and f. means operatively connected with the shaft to produce a signal which varies in correspondence with shaft axial movement.

As will be seen, the housing and flange may progressively seat the first diaphragm at opposite ends of its range of movement, and a head on the shaft and embedded in the first diaphragm facilitates such seating; the second diaphragm may taper in a direction away from the first diaphragm in all positions of the shaft in order to resist retraction of the shaft; both diaphragms may have axial thickness greater than the degree of shaft axial movement; and the signal producing means may advantageously comprise a beam that flexes in response to shaft axial movement, together with a bonded strain gage on the beam, all located forwardly of the second diaphragm, as will be described.

These and other objects and advantages of the invention, as well as the details of an illustrative embodiment, will be more fully understood from the following description and drawings, in which:

DRAWING DESCRIPTION

DETAILED DESCRIPTION

Figure 2:
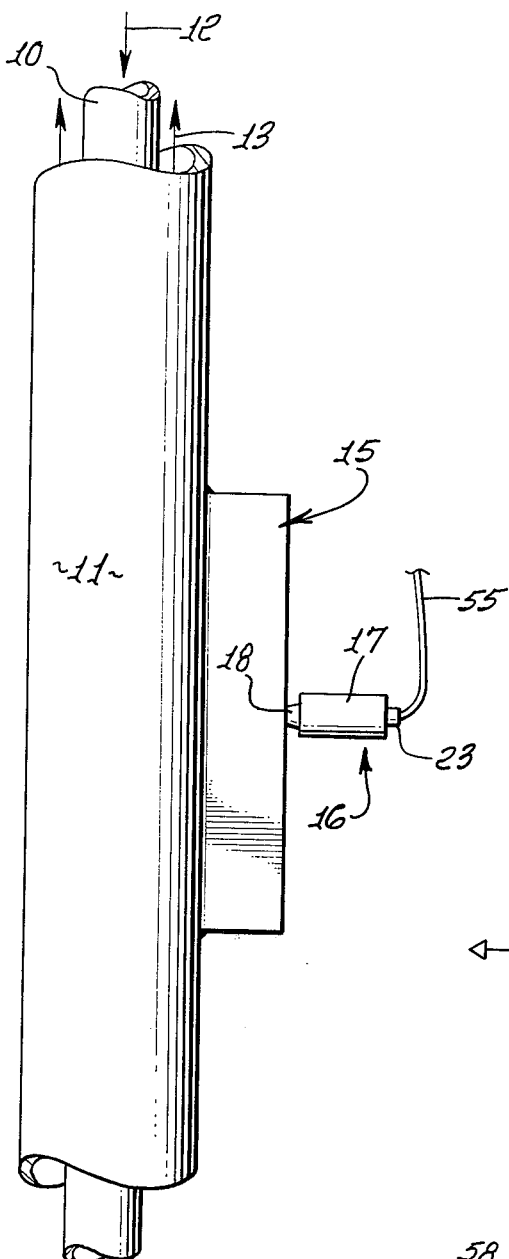
FIG. 2 is an elevation showing an application of the FIG. 1 transducer.

Referring first to FIG. 2, a drill string 10 is shown within a casing or other pipe 11, with drilling mud passing downwardly in the drill string 10 as indicated by arrow 12. Upward return flow of the mud within the annulus in pipe 11 is indicated by arrows 13. Such return flow mud may contain well gas under considerable pressure, and it is desired to know the gas pressure in the mud, as for example at a sub-surface location, so that well blow-out prevention measures may be taken at the surface if the detected gas pressure suddenly rises. In this regard, the numeral 15 indicates a mud gas content sampling device operable to periodically receive a mud sample from within the annulus, to reduce the pressure of the sample allowing expansion of the gas content in the mud for measurement of gas pressure by the transducer 16, and to subsequently return the sample to the annulus. One such device is described in that certain co-pending applicaton of George E. Lewis et al., entitled "Mud Gas Content Sampling Device". The measured values of the mud pressure as initially ingested into device 15, and the reduced pressure, enable determination of the amount of gas in the mud.

Figures 1, 4:
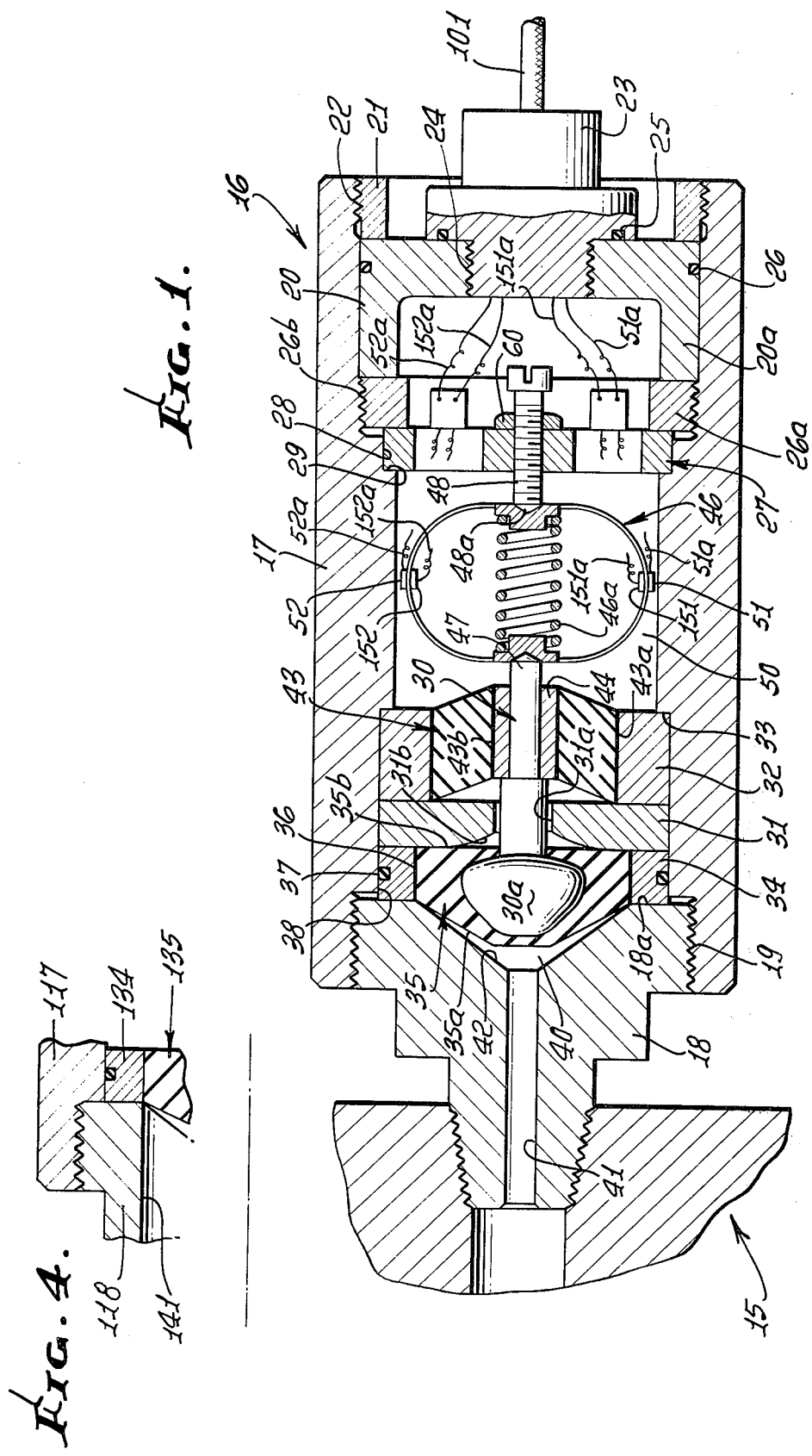
FIG. 1 is a vertical section through one preferred form of transducer embodying the invention.
FIG. 4 is a fragmentary section showing a modification.
Figure 3:
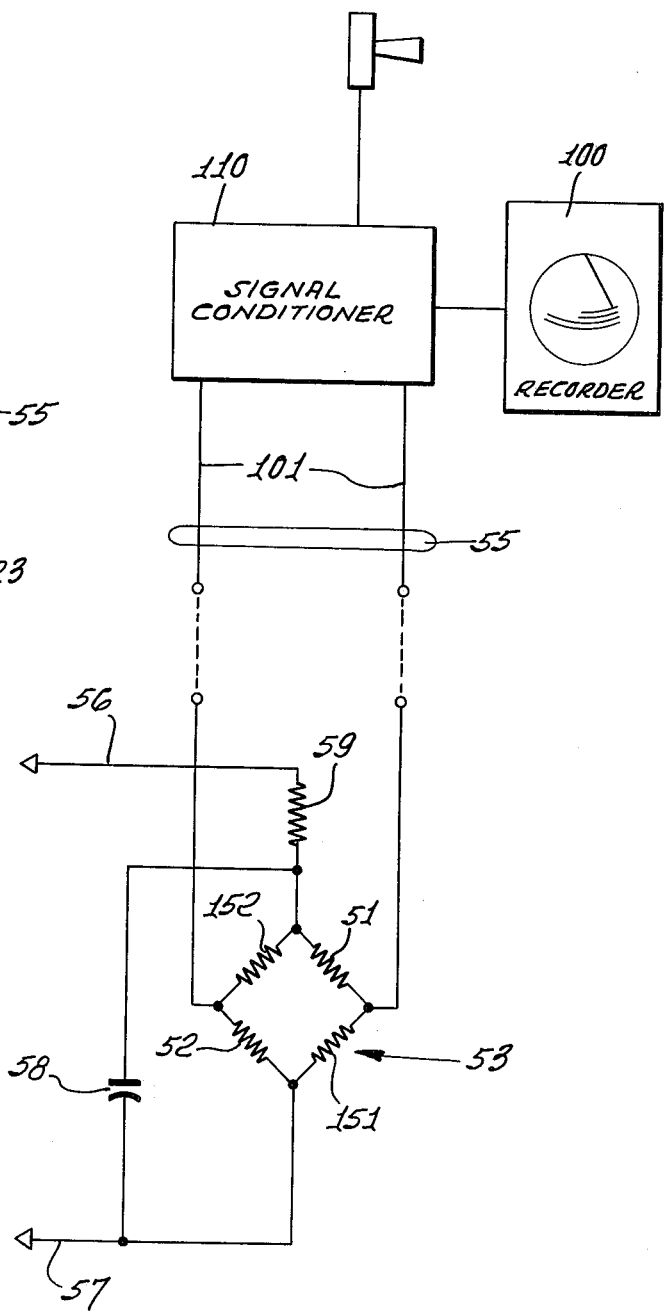
FIG. 3 is a circuit diagram.

Extending the description to the FIG. 1 transducer 16, it is constructed so as to respond to both relatively high pressure (as for example the pressure $P_2$ of the initially ingested mud sample in device 15) and to relatively low fluid pressure (as for example the pressure $P_4$ of the expanded gas in the sample) to produce a corresponding output signal. The latter may be processed in a signal conditioner 110 of FIG. 3 (and displayed at surface recorder 100) connected via leads 101 with the transducer.

The transducer 16 includes a housing, as for example may comprise a tubular body 17 closed at one end by end cap 18 having threaded connection to the body at 19. At its opposite end the body is closed by sleeve 20 retained in position by annular nut 21 having threaded connection at 22 to the body, and by a water-tight cable connection 23 having threaded connection at 24 to the sleeve. Annular seals are provided at 25 and 26, and an annular part 26a is retained in position by the sleeve skirt 20a, and threads 26b, and retains a spider 27 in body counterbore 28 and against bore shoulder 29.

An axially movable shaft or rod 30 is centrally located within the housing, and may advantageously incorporate a head 30a at the rearward end of the shaft, i.e. that end closest cap 18. The shaft projects through an opening 31a formed by an annular flange 31, which may be located within the housing between ring 32 seated against body shoulder 33, and a ring 34 retained in position by cap face 18a.

Located within the housing is a first elastomer diaphragm, as for example at 35, having a radially outer ring portion 34 operatively connected with the housing. For this purpose, the diaphragm may be bonded to ring 34 as at interface 36. FIG. 1 also shows an O-ring 37 sealing off between the ring 34 and the body bore 38. The radially inner extent of the diaphragm is attached to the shaft (as for example head 30a embedded in the axially thickened inner extent of the diaphragm) for axial movement therewith at the rearward side of flange 31. The rear side or face 35a of the diaphragm is exposed to application of pressure exerted by fluid communicated to the housing interior 40, as from mud sampler 15 and inlet duct 41 in cap 18. The opposite or forward side 35b of the diaphragm faces the flange rear side 31b, which is configured to progressively limit forward axial displacement of the diaphragm inner portion as the shaft is displaced forwardly. For that purpose, face 31b of the flange may be tapered forwardly and inwardly to progressively seat the diaphragm face 35 b.

It should also be noted that the housing cap element 18 defines an interior seat 42 which faces and seats the diaphragm side 35a in response to relatively low pressure application to the diaphragm, as may occur when the pressure is reduced in the sampler 15, as described. Note that face 42 is tapered rearwardly at a greater angle than the rearward taper of diaphragm face 35a. Further, the diaphragm 35 typically has overall axial thickness proximate head 30a which is at least as great as the range of axial movement of the shaft, as limited by face 31b and face 42.

A second elastomer diaphragm, as for example at 43, is provided at the opposite or forward side of flange 31, and is also operatively connected with shaft 30 to guide its axial movement, and also to resiliently resist axially relatively forward movement of that shaft. Diaphragm 43 has an annular section as shown which tapers radially inwardly and forwardly throughout the range of movement of the shaft. Note that the diaphragms operate under opposed axial forces, as assembled. As a result of the use and configurations of the diaphragms, shaft movement is assured without a "dead band" or snap action. The diaphragm 43 may be bonded to outer ring 32 at 43a, and to inner ring 44 on shaft 30, as at location 43b. Note that the axial thickness of diaphragm 43 is typically as great or exceeds the range of axial movement of the shaft.

Finally, means is operatively connected with the shaft to produce a signal which varies in correspondence with shaft axial movement. Such means advantageously may be located within the housing at the forward side of the diaphragm 43, and may comprise a beam arranged to flex in response to shaft axial movement, together with a bonded strain gage adherent to the beam at a flexing location. In the example, the beam has the form of a loop spring 46 carried in chamber 50 between the forward end 47 of the shaft 30, and the rearward end 48a of an adjusting screw 48. Bonded strain gages 51 and 52, and gages 151 and 152, are affixed to the flexing outer and inner portions of the loop, as shown, and have leads extending at 51a, 52a, 151a and 152a for connection in a bridge as seen at 53 in FIG. 3. As resistances of gages 51, 52, 151 and 152 change in response to shaft movement, the bridge resistance will change, and output current transmitted at 101 to signal conditioner 110 will correspondingly change.

In operation, when measuring low pressure, the diaphragm 35 will be pulled down against the restraining effect of the diaphragm 35. Both diaphragms are typically made of a low hysteresis rubber. The thickness of each of the diaphragms is such that rubber acting in shear will serve as the main spring element when measuring low pressure values. When the pressure is high, the rubber of diaphragm 35 at the top side of the head 30a will act in compression against the flange 31, providing a greater spring constant when measuring the higher pressures. In this regard, contact between the diaphragm 35 and the flange is progressive from the outside toward the center. At some given high pressure the upward travel will terminate. Pressures above this value will be permitted and will not damage the pressure sensing element, but will not produce a correspondingly increasing output signal.

It will be understood that other forms of motion detection devices could be used, as for example, a variable resistor, a variable reluctance, or an LVDT (linear variable differential transformer). An auxiliary spring 46a can be added to the loop 46 or other sensing element to extend the range to higher pressures. Adjustment of the working point of the loop and strain gages can be made by tightening or loosening screw 48 and locking by tightening nut 60.

Electrical connection to the signal processing and recording equipment may be made through an electric cable 55 attached at the watertight cable connection 23. Two wires 56 and 57 supply the power to the strain gage bridge. Capacitor 58 and resistor 59 are used to regulate the bridge excitation voltage. The active wires 101 from the strain gage bridge should be separate and preferably shielded.

The control circuit shown at 110 may include a timing circuit which will change the range when measuring pressures $P_4$ and $P_2$, to be used in solution of the equation:

$$R = \frac{KP_2P_4}{P_2-P_4} \qquad (1)$$

where:
  $R$ = gas content of mud
  $K$ = a calibration constant
  $P_2$ = initial "high" pressure of mud
  $P_4$ = final "reduced" pressure of fluid (mud and gas).

FIG. 4 shows a modification wherein the closure 118 (corresponding to closure 18 in FIG. 1) contains an enlarged inlet duct 141, which prevents clogging due to the presence of any relatively large particles in the inlet fluid. Elements 117, 118, 134 and 135 in FIG. 4 correspond to elements 17, 18, 34 and 35, respectively, in FIG. 1.

Conditioner 110 produces an output corresponding to R in Equation (1), and is a device which can be readily constructed in accordance with known electronic principles.

I claim:

1. In a transducer for responding to both relatively high and relatively low fluid pressures to produce a corresponding output signal, the combination comprising
   a. a housing,
   b. an axially movable shaft within the housing,
   c. an annular flange within the housing and forming an opening through which the shaft projects, d. a first elastomer diaphragm having a radially outer portion operatively connected with the housing and a radially inner portion attached to the shaft for axial movement therewith at one side of the flange, said first diaphragm having one side exposed to pressure application by said fluid communicated to the interior of the housing, the opposite side of the first diagram facing one side of said flange and having engagement with the flange to progressively limit axial displacement of the diaphragm inner portion as the shaft is displaced axially forwardly, e. a second elastomer diaphragm at the opposite side of said flange and operatively connected with the shaft to guide shaft axial movement, and to resist axially forward movement of the shaft, and f. means operatively connected with the shaft to produce a signal which varies in correspondence with shaft axial movement, g. there being means to limit rearward travel of at least one of said diaphragms, h. said shaft having an enlarged reinforcing head centrally embedded within the radially inner portion of the first diaphragm which is thickened to receive the head, i. said one side of the flange tapering inwardly and forwardly relative to the first diaphragm and forwardly of the head to progressively seat said opposite side of the diaphragm that lies directly between said head and said one side of the diaphragm.

2. The combination of claim 1 wherein said means is located within the housing at the side of the second diaphragm opposite said flange.

3. The combination of claim 2 wherein said means comprises a beam arranged to flex in response to shaft axial movement, and a strain gage bonded to said beam at a flexing location.

4. The combination of claim 3 including means to adjust the flexed condition of the beam in the form of a loop.

5. In a transducer for responding to both relatively high and relatively low fluid pressures to produce a corresponding output signal, the combination comprising a. a housing, b. an axially movable shaft within the housing, c. an annular flange within the housing and forming an opening through which the shaft projects, d. a first elastomer diaphragm having a radially outer portion operatively connected with the housing and a radially inner portion attached to the shaft for axial movement therewith at one side of the flange, said first diaphragm having one side exposed to pressure application by said fluid communicated to the interior of the housing, the opposite side of the first diagram facing said flange configured to progressively limit axial displacement of the diaphragm inner portion as the shaft is displaced axially forwardly, e. a second elastomer diaphragm at the opposite side of said flange and operatively connected with the shaft to guide shaft axial movement, and to resist axially forward movement of the shaft, and f. means operatively connected with the shaft to produce a signal which varies in correspondence with shaft axial movement, g. said housing including a closure defining an interior seat facing said one side of the first diaphragm for seating said one side in response to relatively low pressure application to said one side of the diaphragm.

6. In a transducer for responding to both relatively high and relatively low fluid pressures to produce a corresponding output signal, the combination comprising a. a housing, b. an axially movable shaft within the housing, c. an annular flange within the housing and forming an opening through which the shaft projects, d. a first elastomer diaphragm having a radially outer portion operatively connected with the housing and a radially inner portion attached to the shaft for axial movement therewith at one side of the flange, said first diaphragm having one side exposed to pressure application by said fluid communicated to the interior of the housing, the opposite side of the first diagram facing said flange configured to progressively limit axial displacement of the diaphragm inner portion as the shaft is displaced axially forwardly, e. a second elastomer diaphragm at the opposite side of said flange and operatively connected with the shaft to guide shaft axial movement, and to resist axially forward movement of the shaft, and f. means operatively connected with the shaft to produce a signal which varies in correspondence with shaft axial movement, g. said housing including a closure defining an interior seat facing said one side of the first diaphragm for seating said one side in response to relatively low pressure application to said one side of the diaphragm, h. said second diaphragm having an annular section tapering radially inwardly and forwardly, and that continues to taper as described as said one side of the first diaphragm approaches the interior seat in response to shaft movement in a retraction direction.

7. The combination of claim 6 wherein said section of the second diaphragm has axial thickness at least as great as the range of axial movement of the shaft.

8. In a transducer for responding to both relatively high and relatively low fluid pressures to produce a corresponding output signal, the combination comprising a. a housing, b. an axially movable shaft within the housing, c. an annular flange within the housing and forming an opening through which the shaft projects, d. a first elastomer diaphragm having a radially outer portion operatively connected with the housing and a radially inner portion attached to the shaft for axial movement therewith at one side of the flange, said first diaphragm having one side exposed to pressure application by said fluid communicated to the interior of the housing, the opposite side of the first diagram facing said flange configured to progressively limit axial displacement of the diaphragm inner portion as the shaft is displaced axially forwardly, e. a second elastomer diaphragm at the opposite side of said flange and operatively connected with the shaft to guide shaft axial movement, and to resist axially forward movement of the shaft, and f. means operatively connected with the shaft to produce a signal which varies in correspondence with shaft axial movement, g. said shaft having a head centrally embedded in the radially inner portion of the first diaphragm, said first diaphragm having overall axial thickness proximate said head which is at least as great as the range of axial movement of the shaft.

* * * * *